Patented July 15, 1952

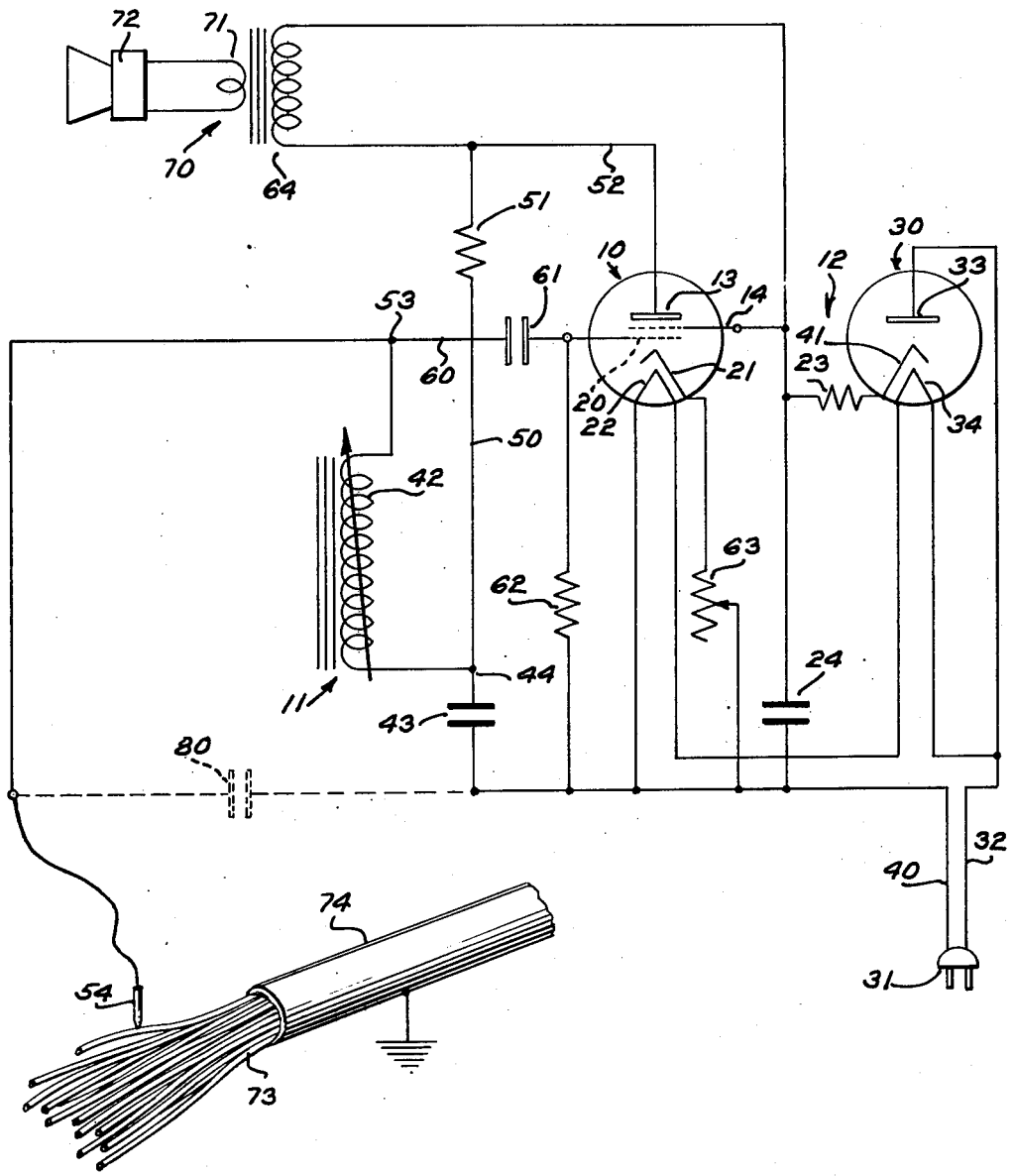

2,603,686

UNITED STATES PATENT OFFICE 2,603,686

ELECTRICAL TESTING APPARATUS

Stanley M. Lloyd, West Englewood, N. J., assignor to Western Electric Company, Incorporated, New York, N. Y., a corporation of New York Application October 19, 1948, Serial No. 55,348

7 Claims. (Cl. 175—183)

This invention relates to electrical testing methods and apparatus and more particularly to apparatus and methods for detecting crossed and grounded conductors in electrical cables.

An object of this invention is to provide a new and efficient method of and apparatus for detecting electrical faults.

In accordance with one embodiment of this invention an apparatus for detecting crossed or grounded conductors in a telephone cable of unconnected conductors is provided with an electronic oscillator circuit that is dormant until a certain amount of capacity is introduced between the grid end of the tank circuit and ground at which time the circuit will begin to oscillate at an audiofrequency which is detected by a loud speaker connected to the output of the oscillator. When a test probe connected to the grid end of the tank circuit is touched to an ungrounded cable conductor, the capacity to ground of the conductor supplies the capacity required to cause the circuit to oscillate and the signal and pitch thereof provide an indication of the condition of the conductor.

A complete understanding of this invention will be had by referring to the following detailed description taken in conjunction with the single figure drawing which illustrates in diagrammatic form one embodiment of the invention.

As shown in the drawing, the apparatus is provided with an oscillator tube 10, a tank circuit 11 coupled to the grid and output circuits of the tube 10, and a high-voltage power supply 12 for the tube 10. The tube 10 may be any suitable type which will provide oscillations at audiofrequencies, the one shown being a tetrode having an anode 13, a screen grid 14, a control grid 20, a cathode 21 and a cathode heater 22.

The power supply 12 includes a resistor 23, a filter condenser 24 and an electronic rectifier 30 whose elements may be disposed in the envelope of the tube 10. A suitable source of alternating current (not shown), for example, a conventional 115 volt A. C. supply line is connected to the apparatus by means of a plug 31. One conductor 32 from the plug 31 is connected to the anode 33 of the rectifier 30 and to heater filaments 22 and 34, while the other conductor 40 forms the negative side of a power supply, the positive side being taken from the cathode 41 of the rectifier 30. The conductor 40 is coupled to ground through the A. C. supply line to which the plug 31 is connected. If a battery is substituted for the rectified power supply, conductor 40 may be coupled to ground directly or through a condenser.

The tank circuit 11, which comprises an inductance coil 42 and a condenser 43, is coupled at one end 44 (lower end in the drawing) to the anode circuit of the tube 10 through a conductor 50, a resistor 51 and a conductor 52. At its other end 53 the tank circuit is connected to a test probe 54 and is coupled through a conductor 60 and a grid coupling condenser 61 to the control grid 20 of the tube 10. A grid-leak resistor 62 is coupled between the control grid 20 and the negative side 40 of the power supply, which is also connected to the cathode 21 through a volume control 63 and to the cathode heaters 22 and 34 to complete the cathode heater circuit.

Positive voltage from the power supply 30 is applied to the anode 13 through the resistor 23 and the primary winding 64 of an output transformer 70, and the screen grid 14 receives positive voltage through the resistor 23. A secondary winding 71 of the output transformer 70 is connected to the voice coil of a loud speaker 72.

The apparatus described will oscillate when the proper amount of anode output of the tube is fed back to the control grid circuit through the tank circuit, and the amount of feedback is determined by the ratio existing between the capacity of the condenser 43 and the capacity between the point 53 and the conductor 40 or ground, as represented by a condenser 80 shown in the dotted line. In this embodiment the condenser 80 is the capacitance to ground at the probe, and the circuit constants of the apparatus should be such that it will be dormant and will not oscillate unless sufficient capacity is introduced between the grid end 53 of the tank circuit and ground to provide the ratio of grid to plate voltage necessary to initiate and sustain oscillations in the circuit. Preferably the inductance 42 is of the adjustable type in order to more conveniently meet the relative inductance requirements. The requisite capacity to cause oscillations is provided when the test probe 54 is made to contact a free conductor in a cable, which conductor is capacitively coupled to ground either through an adjacent grounded conductor or a cable sheath which is coupled to ground or both. Such an example is illustrated in the drawing wherein a plurality of free insulated conductors 73 are encased in a metal sheath 74 which has some coupling to ground.

All the conductors in a cable will produce a whistle in the loud speaker of the same pitch. However, if a conductor is crossed with another, the capacity to ground is substantially double and the pitch of the whistle will drop about one-half of an octave to give an audible indication of the fault. Since nearly all persons can detect a sudden change in pitch of one-half tone, the crossed conductor is readily identified. If the set is operated in the range of 500 to 3,000 cycles per second, any person without a serious hearing impediment would have no difficulty in detecting the change.

Connection to a conductor which is connected to ground will prevent the apparatus from whistling and in order to differentiate this condition from a completely open circuit, a potential from the plate circuit of the oscillator is applied to the test probe through a relatively high resistance 51. This causes a distinctive click when the probe is touched to a directly grounded conductor.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A test set for determining characteristics of electrical apparatus wherein the capacity-to-ground of the apparatus is a measure of said characteristics, said test set comprising an electronic discharge device having a cathode, a control grid and an anode, means for supplying anode voltage to said device, audible signal means coupled to said anode, a feedback circuit coupled to said anode and to said control grid, and a probe coupled to the control grid end of said feedback circuit for contacting apparatus to be tested, said test set being adapted to emit an audible signal when the capacity-to-ground of said apparatus is connected through said probe to the control grid end of said feedback circuit.

2. A test set for determining characteristics of electrical apparatus wherein the capacity-to-ground of the apparatus is a measure of said characteristics, said test set comprising a normally dormant oscillator comprising an electronic discharge device having a control grid and an output circuit, and a feedback circuit coupled to the control grid and to the output circuit, an audible signal means coupled to said output, said oscillator being adapted to oscillate at an audio rate when a sufficient amount of capacity is introduced between the grid-coupled end of the feedback circuit and ground, and a test probe connected to the grid coupled end of the feedback circuit for contacting electrical apparatus to be tested.

3. A test set comprising a normally dormant oscillator having an output and a control grid circuit, an audible signal means coupled to said output, and a test probe for coupling the control grid circuit to a device under test thereby to add the capacity-to-ground of said device to the control grid circuit thus to initiate sustained audio-oscillations in said test set.

4. A test set comprising a normally dormant electronic oscillator having an anode output and a control grid circuit, an audible signal means coupled to said output, a source of anode current coupled to said anode output, a test probe for coupling the control-grid circuit to a device under test thereby to add the capacity-to-ground of said device to the control grid circuit thus to initiate sustained audio-oscillations in said test set, and means for generating an audible click in said audible signal means to indicate contact of said test probe to direct ground, the last means comprising a resistance connected between said probe and said anode output circuit.

5. A test set for determining characteristics of electrical apparatus wherein the capacity-to-ground of the apparatus is a measure of said characteristics, said test set comprising an electronic discharge device having a cathode, a control grid and an anode, means for supplying anode voltage to said anode, audible signal means coupled to said anode, a feedback circuit coupled to said anode and to said control grid, a probe coupled to the control grid end of said feedback circuit for contacting apparatus to be tested, said test set being adapted to emit an audible signal when the capacity-to-ground of said apparatus is connected through said probe to the control grid end of said feedback circuit, and means for generating an audible click in said audible signal means to indicate when said probe contacts a direct ground, said last means comprising a resistance connected between said probe and said anode to form a path from ground through said signal means to said anode supply means.

6. A test set for locating crossed conductors of a cable having a grounded conductive sheath, which comprises an electronic discharge device having a control grid and an output circuit, a feedback tank circuit including a capacitive reactance coupled to the control grid and the ouput circuit, audible signal means variably responsive to variable frequencies coupled to said output circuit, and a test probe connected to the grid-coupled end of the tank circuit for contacting one of a plurality of insulated conductors of a cable having a grounded conductive sheath, said capacitive reactance of the tank circuit being of such a value that oscillations of one pitch are transmitted to the signal means when the probe contacts one of said conductors which is not crossed with another and oscillations of a different pitch are transmitted to the signal means when the test probe contacts one of the insulated conductors crossed with another of the insulated conductors.

7. A test set, which comprises a test probe for engaging one after another a plurality of individually insulated conductive cores enclosed in a conductive sheath, an electronic tube including an anode, a cathode and a control grid, an output circuit including the anode and the cathode, audible signal means variable in pitch in response to varied audio frequency oscillatory electric current and coupled to said output circuit, and a feedback tank circuit coupled to the output circuit at one end and the control grid and the test probe at the other end of such characteristics that oscillatory currents of the frequency of one pitch are sustained in the output circuit when the test probe engages an uncrossed one of the conductive cores and oscillatory currents of a different pitch are sustained in the output circuit when the test probe is connected to a conductive core crossed with another core.

STANLEY M. LLOYD.

REFERENCES CITED

The following references are of record in the file of this patent:

UNITED STATES PATENTS

| Number | Name | Date |
|---|---|---|
| 1,793,970 | Simon et al. | Feb. 24, 1931 |
| 1,990,085 | Mudge et al. | Feb. 5, 1935 |
| 2,071,607 | Bjorndal | Feb. 23, 1937 |
| 2,094,351 | Draper et al. | Sept. 28, 1937 |
| 2,373,079 | Morelock | Apr. 3, 1945 |
| 2,393,717 | Speaker | Jan. 29, 1946 |